(12) United States Patent
Ross et al.

(10) Patent No.: US 10,065,312 B1
(45) Date of Patent: Sep. 4, 2018

(54) UNSCENTED OPTIMIZATION AND CONTROL ALLOCATION

(71) Applicant: The United States of America, as represented by the Secretary of the Navy, Washington, DC (US)

(72) Inventors: Isaac Michael Ross, Monterey, CA (US); Mark Karpenko, Salinas, CA (US); Ronald J. Proulx, Waban, MA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 276 days.

(21) Appl. No.: 15/208,784

(22) Filed: Jul. 13, 2016

Related U.S. Application Data

(60) Provisional application No. 62/191,568, filed on Jul. 13, 2015.

(51) Int. Cl.
  *B25J 9/16* (2006.01)
(52) U.S. Cl.
  CPC ... *B25J 9/1661* (2013.01); *G05B 2219/40519* (2013.01)
(58) Field of Classification Search
  CPC ............. B25J 9/1664; G05B 2219/40519
  See application file for complete search history.

(56) References Cited

U.S. PATENT DOCUMENTS

| | | | | |
|---|---|---|---|---|
| 4,860,215 A | * | 8/1989 | Seraji | ............ B25J 9/163 |
| | | | | 700/260 |
| 4,999,553 A | * | 3/1991 | Seraji | ............ B25J 9/1643 |
| | | | | 318/628 |

(Continued)

OTHER PUBLICATIONS

Julier et al, "Unscented Filtering and Nonlinear Estimation," Proceedings of the IEEE 92(3) (2004).

(Continued)

*Primary Examiner* — Kenneth M Lo
*Assistant Examiner* — David J Wynne
(74) *Attorney, Agent, or Firm* — Naval Postgraduate School; James B. Potts

(57) ABSTRACT

The disclosure provides a robotic arm controller which determines a control parameter for at least one actuator comprising the robotic arm using a control equation having the general form Ax=b, where A is a transformation matrix A based on the geometry and Jacobian of the robotic arm, x is the control parameter x such as a torque vector at a specific joint, and b is the end effector parameter b which specifies a desired corrective state of the end effector. The methodology, by way of constructing and solving an unscented optimization problem, provides a solution to the Ax=b problem by perturbing at least one joint angle appearing in the Jacobian to generate a plurality of distributed joint angles, determining a control parameter x which minimizes an error function. In a particular embodiment, the error function is sum of residual squares, and the appropriate control parameter x is determined by minimizing the error function subject to a series of constraints $A_i x - b - z_i = 0$, where each constraint arises by virtue of the error generated through use of a given joint angle in the plurality of distributed joint angles selected.

20 Claims, 9 Drawing Sheets

(56) References Cited

U.S. PATENT DOCUMENTS

| | | | | |
|---|---|---|---|---|
| 5,499,320 | A * | 3/1996 | Backes | B25J 9/1602 |
| | | | | 700/260 |
| 5,550,953 | A * | 8/1996 | Seraji | B25J 9/162 |
| | | | | 700/262 |
| 5,602,968 | A * | 2/1997 | Volpe | B25J 9/1664 |
| | | | | 318/568.18 |
| 6,456,901 | B1 * | 9/2002 | Xi | B25J 9/1607 |
| | | | | 318/568.17 |
| 8,874,262 | B2 * | 10/2014 | Mistry | G05B 19/00 |
| | | | | 294/106 |

OTHER PUBLICATIONS

Julier, "The spherical simplex unscented transformation," American Control Conference, 2003. Proceedings of the 2003 (3) (2003).

Julier et al., "A new approach for filtering nonlinear systems," American Control Conference, Proceedings of the 1995 (3) (1995).

Turner et al., "Model based learning of sigma points in unscented Kalman filtering," 2010 IEEE International Workshop on Machine Learning for Signal Processing (2010).

Wan et al., Kalman Filtering and Neural Networks (ed S. Flaykin), pp. 221-279, (2001).

Kucuk, S, Industrial Robotics Theory, Modeling, and Control (ed. S. Cubero), pp. 117-148, (2006).

* cited by examiner

UNSCENTED OPTIMIZATION AND CONTROL ALLOCATION

RELATION TO OTHER APPLICATIONS

This patent application claims priority from provisional patent application 62/191,568 filed Jul. 13, 2015, which is hereby incorporated by reference in its entirety.

FIELD OF THE INVENTION

One or more embodiments relates to an apparatus and method for control of a robotic arm through utilization of a manipulator Jacobian for transformations between operational and task spaces.

BACKGROUND

In the art of robotics, the term generalized coordinates refers to a characterization of the system that uniquely defines its configuration. For example, in a two-link planar manipulator, the robot has two degrees-of-freedom (DOF) so two joint variables, $\theta_1$ and $\theta_2$, can be referred to as generalized coordinates as these variables and may be used to define the position of the robot. Thus, control of the position of the end-effector of the manipulator may be done in the joint space since with the knowledge of each joint angle, the position of the end-effector may be determined.

In practice, it is often the case that the desired position of the end-effector is given in terms of an operation space also known to those of skill in the art as a task space. For the two-link planar robotic manipulator an example of an operation space is the Cartesian coordinate system defining a plane of operation of the robot. An operator of a robot may require that the end-effector be moved to a specific point, P(x, y), in order to perform a task, such as placing a spot weld, or picking a part on an assembly line. Defining the position of the robot in the Cartesian coordinate system is advantageous for an operator of the robot. However, a description of the point P(x, y) does not uniquely define the configuration of a robotic arm in terms of the joint variables. As is understood, a two-link planar manipulator can reach the same point P(x, y) using two different configurations: an elbow-up configuration or an elbow-down configuration. A manipulator with redundant degrees-of-freedom may have more than two configurations that allow the manipulator to reach the same point in an operation space further complicating the choice of a robot joint configuration that should be used to perform a task. Because an operation space may not uniquely define a configuration of a robotic arm, joint space control, i.e. control of the robot joint variables $\theta_1$ and $\theta_2$, cannot be readily performed. This is because it may not be obvious how to specify a joint space trajectory for each of the manipulator's joints to control the position of the end-effector.

A fundamental challenge associated with operation space control as described is the fact that the rows of the Jacobian J(q) may lose rank (become singular). In this case, it is not possible to compute a control vector in the joint space that produces the necessary operation space forces. A two-link planar manipulator has a singular Jacobian when $\theta_2=0$ and when $\theta_2=\pi$. In these cases, the two links of the manipulator are co-linear and forces cannot be produced in the degenerate direction. This implies that there is no combination of joint torques, $\tau_\theta$, that can produce a desired force vector, $F_x$. One approach for circumventing the problem is to detect the potential for singularities by identifying degenerate directions and setting the commended force in those directions equal to zero. Generally, by identifying degenerate directions appropriately, it is possible to compute control parameters such as a control torque vector that allows the manipulator to pass through the singular configuration and complete a desired task. However, typically when the manipulator operates near a singular configuration, the values of control parameters such as computed control torques can change sharply and suddenly. These sudden changes in control parameters can excite vibrational modes in manipulator links and potentially reduce the accuracy of the robotic control system. In addition, suddenly changing the control torque command may be damaging to the joint actuators. It is therefore advantageous to develop control methodologies that avoid sudden and sharp changes in the manipulator control torques.

Disclosed here is a means for mitigating this issue by generating control parameters based using a plurality of distributed joint angles having a distribution generally about a given joint angle in a robotic manipulator. The disclosed controller determines and communicates control parameters to at least one actuator in order to generate motion of the robotic arm and displacement of the end effector in a manner that mitigates the sharp and sudden changes in commanded control parameters associated with the currently utilized methods. The method is particularly useful when applied in the neighborhood of joint angles generating a singular Jacobian.

These and other objects, aspects, and advantages of the present disclosure will become better understood with reference to the accompanying description and claims.

SUMMARY

The disclosure provides a robotic arm controller evaluating a feedback equation to determine an end effector parameter necessary for correction of positional or other errors associated with the performance of an operational task. The controller determines a control parameter x for at least one actuator based on the discrepancy indicated by utilizing a control equation having the general form Ax=b, where A is a transformation matrix A based on the geometry and a manipulator Jacobian of the robotic arm, x is the control parameter x such as a torque vector at a specific joint in a joint space, and b is the end effector parameter b which specifies a desired corrective state of the end effector based on evaluation of the feedback equation, such as a command acceleration given in an operation space. The novel methodology differs from current control schemes in that a solution to the Ax=b problem is determined by perturbing at least one joint angle appearing in the Jacobian of the robotic arm to generate a plurality of distributed joint angles, with the result that each resulting perturbed joint angle generates an error, z, when utilized in the Ax=b control relationship so that the solution Ax=b+z is obtained. The methodology disclosed then determines the control parameter x by determining a value for the control parameter x which minimizes an error function, where the error function comprises each error generated by each joint angle in the selected plurality of distributed joint angles. In a particular embodiment, the error function is a sum of residual squares, an $L_1$ norm, or infinity norm, and the appropriate control parameter x is determined by minimizing the error function subject to a series of constraints $A_i x - b - z_i = 0$, where each constraint arises by virtue of the error generated through use of a given joint angle in the plurality of distributed joint angles selected.

In a particular embodiment, the plurality of distributed joint angles evaluated is determined by sensing an actual joint angle of the robotic arm and utilizing a Gaussian or uniform probability function parameterized by mean and variance ($\mu$, $\sigma^2$) or any other probability function selected by a user of the invention. In another embodiment, the plurality of distributed joint angles evaluated are sigma points of the Gaussian or uniform probability function ($\mu$, $\sigma^2$) or other probability function. The control equation may be evaluated and the plurality of distributed joint angles selected by a processor in a substantially continuous fashion based on the sampling frequency of a feedback compensator, or may be employed only within a neighborhood around specific joint angles. The controller acts to generate motion of the robotic arm and displacement of the end effector in a manner that mitigates sharp and sudden changes in commanded control parameters associated with currently utilized methods, and is particularly useful when applied in the neighborhood of joint angles generating a singular Jacobian.

The novel apparatus and principles of operation are further discussed in the following description.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a robotic arm controller which determines a control parameter through minimization of an error function subject to a series of constraints arising through evaluation of a plurality of distributed joint angles generally distributed about a given joint angle.

The disclosure provides a robotic arm controller which determines a control parameter for moving an end effector of a robotic arm from an initial point to a subsequent point. The robotic arm comprises a plurality of joined linkages and typically exhibits multiple joint angles during transit of the end effector, and further comprises a group of at least one actuator attached to the robotic arm and configured to generate motion of at least one of the plurality of links and a group of sensors providing at least one joint angle established by the robotic arm. The robotic arm controller additionally comprises a processor in communication with the group of actuators and the group of sensors.

Figure 1:
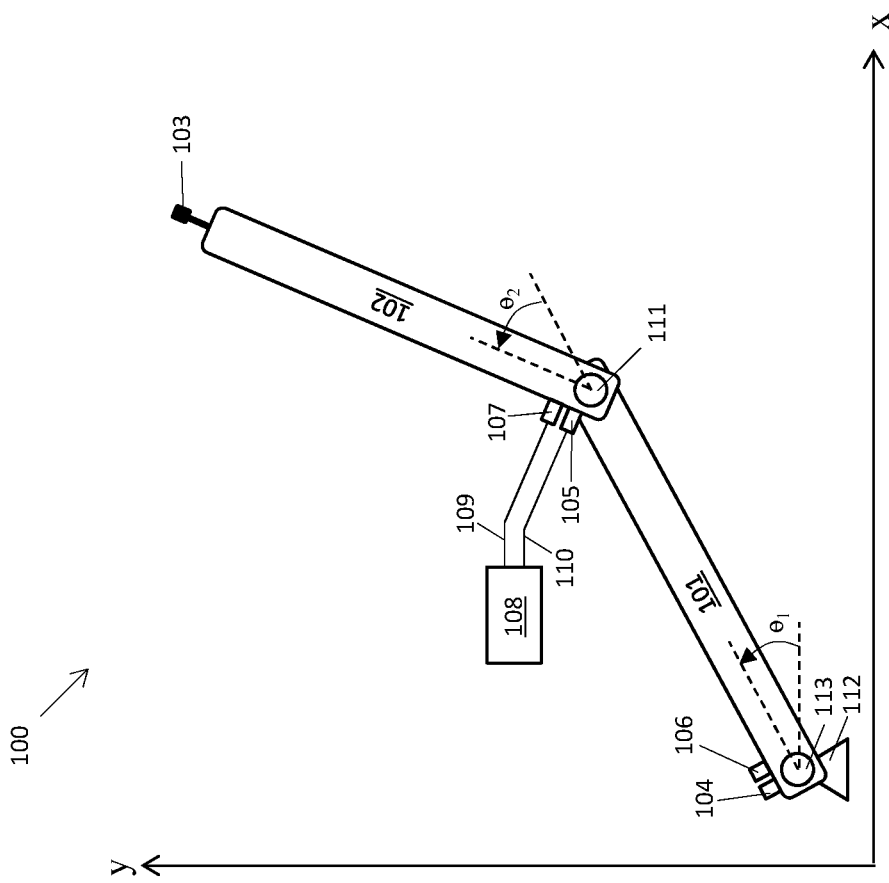
FIG. 1 illustrates an embodiment of the robotic arm controller.

A particular embodiment of the robotic arm controller is shown at FIG. 1. FIG. 1 illustrates a particular robotic arm controller 100 having a robotic arm comprising a plurality of links such as link 101 and link 102 and an end effector 103, a group of sensors comprising for example, sensor 104 and sensor 105, a group of actuators for example actuator 106 and actuator 107, and a processor 108. Processor 108 is in communication with the group of sensors and the group of actuators at for example 109 and 110. In the embodiment of FIG. 1, links 101 and 102 and are connected by joint 111 and establishes joint angle and $\theta_2$ as indicated, and link 101 is connected to fixed foundation 112 by joint 113 and establishes joint angle $\theta_1$ as indicated. As is understood, kinematics may be employed to determine positions of an end effector such as end effector 103 from specified values for the joint parameters such as $\theta_1$ and $\theta_2$, and manipulator Jacobians may be utilized to effect a transformation from an operation (task) space such as that defined by the x and y axes of FIG. 1 to a configuration (joint) space such as that defined by $\theta_1$ and $\theta_2$. See e.g., Sam Cubero, *Industrial Robotics: Theory, Modeling, and Control* (2006), among many others.

Processor 108 of the robotic arm controller operates by utilizing a feedback equation comparing an actual position of end effector 103 to a desired position of end effector 103, where the desired position is based on a proposed transit of end effector 103 from, for example, some initial point to some subsequent point. For example, the feedback equation might take a form $\ddot{x}_{des}(t)=K_p(x_{des}(t)-x(t))$ where $x_{des}(t)$ is a desired position of end effector 103 at a time t and x(t) is an actual position of end effector 103 at time t. Processor 108 evaluates the feedback equation to determine an end effector parameter b necessary for correction, and then determines a control parameter x for at least one actuator based on the discrepancy indicated by utilizing the novel methodology disclosed. For example referring to the feedback equation given above an end effector parameter for correction is given by $\ddot{x}_{des}(t)$ where a control parameter x for at least one actuator can be a torque command or an electrical current command or a reference voltage command or any other suitable input to the at least one actuator.

The control parameter x is determined by a novel solution methodology applied to a control allocation equation having the general form Ax=b, where A is a transformation matrix based on the geometry and Jacobian of the robotic arm, x is a control parameter x such as a torque vector at a specific joint, and b is the end effector parameter b which specifies a desired corrective state of the end effector based on evaluation of a feedback equation. For example, the end effector parameter b might be an acceleration vector desired at the end effector as a correction based on the feedback equation at a given point in time, and solution of the control equation might provide a torque vector as the control parameter x, to be generated by an actuator at a specific joint within the robotic arm in order to generate the desired acceleration vector. The novel methodology differs from current control schemes in that a solution to the Ax=b problem is determined by perturbing at least one joint angle appearing in the Jacobian of the robotic arm to generate a plurality of distributed joint angles which in turn generates a plurality of specific transformation matrices $A_i$, with the result that each resulting joint angle generates an error when utilized in an $A_o x = b$ control relationship, where $A_0$ is a transformation matrix resulting from the unperturbed joint angle(s) and x is a given solution of the control equation. In an embodiment, $A_o$ comprises a manipulator Jacobian, as discussed below. In another embodiment, $A_o$ comprises at least one parameter having a value dependent on the value of a joint angle of the robotic arm. The methodology disclosed then determines the control parameter x by determining a value for the control parameter x which minimizes an error function, where the error function comprises each error generated by each joint angle in the selected plurality of distributed joint angles. In an embodiment, the error function is such that the absolute value of the error function decreases as a summation of the individual errors comprising the error function decreases. In a particular embodiment, the error function is sum of residual squares, an $L_1$ norm, or infinity norm. In a further embodiment, the appropriate control parameter x is determined by minimizing the error function subject to a series of constraints $A_i x - b - z_i = 0$, where each constraint arises by virtue of the error generated through use of a given joint angle in the plurality of distributed joint angles selected.

The robotic arm controller of the disclosed methodology acts to mitigate sudden and sharp changes in the control parameter x as the end effector transits from some initial point to a subsequent point. As discussed, processor 108 is in communication with one or more sensors in order to determine an actual position of the end effector at a given point in time, and additionally in order to evaluate the feedback equation using the actual position and a desired position for determination of the end effector parameter b necessary for correction. The processor senses at least one joint angle established by the robotic arm, and determines a prospective control parameter x by selecting a plurality of distributed joint angles having a distribution generally about the sensed joint angle. The processor utilizes this plurality of distributed joint angles to define an error $z_i$ for each joint angle based on the $Ax = b$ control equation, so that generally $A_i x - b = z_i$ or stated equivalently $A_i x - b - z_i = 0$. Here, $A_i$ is a specific transformation matrix $A_i$ resulting when a given joint angle from the plurality of distributed joint angles is utilized in the transformation matrix A, and as before, b is the end effector parameter b necessary for correction based on evaluation of the feedback equation. The processor subsequently utilizes the $A_i x - b - z_i = 0$ expressions formulated for each joint angle in the plurality of distributed joint angles as a series of constraints. The processor additionally evaluates an error function comprising each of the errors $z_i$ in the plurality of errors. In a particular embodiment, the error function is a residual sum of squares. The processor acts to determine the prospective control parameter x by minimizing the error function, subject to each constraint $A_i x - b - z_i = 0$ comprising the series of constraints. Following the minimization operation and determination of the prospective control parameter x, the processor communicates the prospective control parameter x to at least one actuator in the group of actuators in order to generate motion of the robotic arm and displacement of the end effector.

In a particular embodiment, the plurality of distributed joint angles selected by processor 108 for evaluation are determined by sensing an actual joint angle of the robotic arm and utilizing a Gaussian or uniform probability function having parameters $(\mu, \sigma^2)$, where the $\mu$ is the actual joint angle and the $\sigma$ is a standard deviation. In an embodiment, the standard deviation is less than or equal to about 20 degrees, in another embodiment, less than or equal to 10 degrees, and in a further embodiment less than or equal to 5 degrees. Each specific joint angle in the plurality of distributed joint angles satisfies a relationship $0.8 \leq \theta/\theta_M \leq 1.2$, where the $\theta$ is the each specific joint angle in the selected plurality of distributed joint angles, and the $\theta_M$ is an angle on the probability function $(\mu, \sigma^2)$. In a particular embodiment, $0.9 \leq \theta/\theta_M \leq 1.1$, and in a further embodiment, $0.95 \leq \theta/\theta_M \leq 1.05$. In another embodiment, each $\theta_M$ is a sigma point of the probability function $(\mu, \sigma^2)$. As is understood, sigma points (and their associated weights) describe a collection of points and weights in a distribution where, if treated as elements of a discrete probability distribution, weighted sums of the sigma points can be constructed to reflect a mean and variance equal to the given mean and variance of the probability function $(\mu, \sigma^2)$. See e.g., Julier et al., "A new approach for filtering nonlinear systems," *Proceedings of the American Control Conference* 3 (1995); see also Julier et al., "Unscented Filtering and Nonlinear Estimation," *Proceedings of the IEEE* 92(3) (2004); see also Julier et al, "The Spherical Simplex Unscented Transformation," *Proceedings of the American Control Conference* (2003), among others.

The feedback equation may be evaluated and a plurality of distributed joint angles selected by processor 108 in a substantially continuous fashion based on the sampling frequency of a feedback network, or may be employed only within a neighborhood around specific joint angles that produce or approach singularities of the transformation matrix A, or some combination therein. Specific values or ranges of a plurality of distributed joint angles utilized are typically not a strict limitation within this disclosure.

In a particular embodiment, the robotic control system comprises a robotic arm comprising a plurality of links and an end effector, a group of sensors providing at least one joint angle established by the robotic arm, and a processor in communication with the group of sensors and the group of actuators. The processor is configured to determine an actual position of the end effector at a given time t and a desired position of the end effector at a given time t, and evaluate a feedback equation comprising the desired position and the actual position in order to determine an end effector parameter b, where the end effector parameter b describes a condition at the end effector of the robotic arm. The feedback equation might be for example an equation having the form $\ddot{x}_{des}(t) = K_p(x_{des}(t) - x(t))$ and the end effector parameter b might be for example a desired acceleration at the end effector, as previously discussed. The processor determines a prospective control parameter for at least one actuator in the robotic arm by selecting a plurality of distributed joint angles and minimizing an error function. The plurality of distributed joint angles are typically distributed about the value of a given joint angle of the robotic arm. The processor then determines a control parameter x to be applied to the given joint angle by minimizing an error function. The error function comprises a plurality of errors, where each error arises as each specific joint angle in the plurality of distributed joint angles is utilized in the transformation matrix A in an $Ax = b$ control equation. The appropriate control parameter x is selected as the prospective control parameter x which minimizes the error function, subject to the constraints provided. For example, the appropriate control parameter x might be the control parameter x which minimizes an error function such as a residual sum of squares, subject to a series of constraints having the form $A_i x - b - z_i = 0$, where $A_i$ is a specific transformation matrix $A_i$ which arises for each specific joint angle within the plurality of distributed joint angles, and which results when the specific joint angle is utilized in the transformation matrix A. Following the minimization and determination of the control parameter x, the control parameter x is communicated to an actuator of the robotic arm.

The robotic arm controller generally utilizes manipulator Jacobians in order to determine the prospective control parameter x communicated to the at least one actuator. As is understood, manipulator Jacobians may be utilized to effect a transformation from an operation (task) space such as that defined by the x and y axes of FIG. 1 to a configuration (joint) space such as that defined by $\theta_1$ and $\theta_2$. The Jacobians define the dynamic relationships between two different representations of a given robotic system. A Jacobian matrix is defined as the partial differential equation:

$$J(q) = \frac{\partial x}{\partial q} \qquad (0.1)$$

where x is a vector of operation space coordinates and q is a vector of configuration space variables. For example, for a two-link planar robotic arm, $x=[x, y]^T$ may represent the Cartesian coordinates of the end-effector 103 according to the x and y axes shown and $q=[\theta_1, \theta_2]^T$ may represent the joint angles $\theta_1$ and $\theta_2$ of the configuration space. The elements of the Jacobian matrix relate the change in the value of an element of the vector x to a change in the value of an element in the vector q. Referring to FIG. 1, the relationship between the (x, y) position (operation space) of end effector 103 and the ($\theta_1$, $\theta_2$) joint angles (configuration space) when link 101 and link 102 have lengths $l_1$ and $l_2$ respectively is given as:

$$x = l_1 cos(\theta_1) + l_2 cos(\theta_1 + \theta_2)$$

$$y = l_1 sin(\theta_1) + l_2 sin(\theta_1 + \theta_2) \qquad (0.2)$$

Following from (0.1) and (0.2), the end-effector Jacobian for the two-link planar manipulator of FIG. 1 is $$J(q) = \begin{bmatrix} -l_1 \sin(\theta_1) - l_2 \sin(\theta_1 + \theta_2) & -l_2 \sin(\theta_1 + \theta_2) \\ l_1 \cos(\theta_1) + l_2 \cos(\theta_1 + \theta_2) & l_2 \cos(\theta_1 + \theta_2) \end{bmatrix} \qquad (0.3)$$

The Jacobian matrix can also be used to transform any other variables or control parameters given in terms of the generalized variables into the operation space (or vice-versa by applying the necessary linear algebra). For example, the relationship between controllable joint torques, $\tau$, given in the configuration space and controllable end-effector forces, f, given in the operation space is $$F_x = J(q) \tau_\theta \qquad (0.4)$$

where $F_x = [f_x, f_y]^T$. Subscripts, x and $\theta$, are used in (0.4) to denote the space (operation space and configuration space, respectively) for clarity.

As is understood, a fundamental challenge associated with operation space control as described herein is the fact that the rows of the Jacobian J(q) may lose rank (become singular). A two-link planar manipulator has a singular Jacobian when $\theta_2 = 0$ and when $\theta_2 = \pi$. In these cases, the two links of the manipulator are co-linear and forces cannot be produced in the degenerate direction. This implies that there is no combination of joint torques, $\tau_\theta$, that can produce the desired force vector, $F_x$. One approach for circumventing the matrix inversion problem is to detect the potential for singularities by identifying degenerate directions and setting the commended force in those directions equal to zero. Generally, by identifying degenerate directions appropriately, it is possible to compute control parameters such as a control torque vector that allows the manipulator to pass through the singular angle and complete the desired task. However, typically when the manipulator operates near a singular region, the values of control parameters such as computed control torques can change sharply and suddenly. These sudden changes in control parameters can excite vibrational modes in manipulator links and potentially reduce the accuracy of the robotic position control system. In addition, suddenly changing the control torque command may be damaging to the joint actuators and should therefore be avoided where possible. It is therefore advantageous to develop methods that avoid sudden and sharp changes in the manipulator control torques.

The disclosure herein provides a means for mitigating this issue by generating control parameters based on the previously discussed methodology, where for a given joint angle in the robotic arm, a plurality of distributed joint angles having a distribution generally about the joint angle is determined and typically based on the probability function $(\mu, \sigma^2)$, where $\mu$ is the given joint angle and the $\sigma$ is typically a user selected variance of a given probability function. More typically, the plurality of distributed joint angles have a relationship to a set of sigma points for the probability function $(\mu, \sigma^2)$, as discussed. By utilizing the errors associated with specific transformation matrices $A_i$ for each joint angle as constraints in a minimization of an error function comprising those errors, the controller determines and communicates control parameters to at least one actuator in the group of actuators in order to generate motion of the robotic arm and displacement of the end effector in a manner that mitigates the sharp and sudden changes in commanded control parameters associated with the currently utilized methods. The method is particularly useful when applied in the neighborhood of joint angles generating a singular Jacobian.

Exemplary operations of the robotic arm controller are further discussed in the specific embodiment below.

Description of a Specific Embodiment

One exemplary task is typically to move an end-effector from one location to another. A non-limiting approach for generating an exemplary task trajectory is to implement a feedback equation comprising the desired position and the actual position of the end effector, such as:

$$\ddot{x}_{des}(t) = K_p(x_{des}(t) - x(t)) \qquad (0.5)$$

where $x_{des}(t) = [x_{des}(t), y_{des}(t)]^T$ denotes the desired position of the end effector at a time t, $x(t) = [x(t), y(t)]^T$ denotes the actual position of the end effector at a time t, and $K_p$ is a proportional gain factor that may be a constant or time-varying. Other variations of (0.5) are possible, for example, $\ddot{x}_{des}(t) = K_p(x_{des}(t) - x(t)) + K_D(\dot{x}_{des} - \dot{x})$ where $K_D$ is a so-called derivate gain and the dot notation implies time differentiation of a given signal. Referring back to (0.5), the forces necessary in the operation space to effect the desired acceleration, $\ddot{x}_{des}(t)$, are (following Newton's law)

$$F_x = M_x(q) \ddot{x}_{des} \qquad (0.6)$$

where $M_x(q)$ is an end-effector inertia matrix defined in an operation space.

Substituting (0.4) into (0.6) and rearranging gives the control torques as $$\tau_\theta = [J(q)]^T M_x(q) \ddot{x}_{des} \quad (0.7)$$

A necessary matrix, $M_x(q)$ may be derived by first considering the dynamics of the manipulator which are given in terms of the generalized variables, q, and their time derivatives as $$M(q)\ddot{q} + C(q, \dot{q})\dot{q} = u_q \quad (0.8)$$

where matrix M(q) is the manipulator inertia matrix, matrix $C(q, \dot{q})$ is the matrix of centripetal and Coriolis terms, and vector $u_q$ is the vector of generalized input forces. For the two-link manipulator of FIG. 1 (where subscript 1 denotes link 101 and subscript 2 denotes link 102):

$$M(q) = \begin{bmatrix} I_1 + I_2 + m_1 r_1^2 + m_2(l_1^2 + r_2^2) + \\ 2m_1 l_1 r_2 \cos(\theta_2) & I_2 + m_2 r_2^2 + m_1 l_1 r_2 \cos(\theta_2) \\ I_2 + m_2 r_2^2 + m_1 l_1 r_2 \cos(\theta_2) & I_2 + m_2 r_2^2 \end{bmatrix} \quad (0.9)$$

$$C(q, \dot{q}) = \begin{bmatrix} -m_2 l_1 r_2 \sin(\theta_2)\dot{\theta}_2 & -m_2 l_1 r_2 \sin(\theta_2)(\dot{\theta}_1 + \dot{\theta}_2) \\ m_2 l_1 r_2 \sin(\theta_2)\dot{\theta}_1 & 0 \end{bmatrix} \quad (0.10)$$

$$u_q = \begin{bmatrix} \tau_1 \\ \tau_2 \end{bmatrix} \quad (0.11)$$

In (0.8) gravity terms have been omitted for manipulator operation in a plane perpendicular to a gravity field. Gravity terms could be added if necessary in another instantiation.

The relationship between linear acceleration of the manipulator in the operation space and angular acceleration in the joint space is $$\ddot{x} = \dot{J}\dot{q} + J\ddot{q} \quad (0.12)$$

Substituting (0.7) and (0.8) in (0.12) gives $$\ddot{x} = J(q)M^{-1}(q)J(q)^T M_x(q)\ddot{x}_{des} - J(q)M^{-1}(q)C(q,\dot{q}) + \dot{J}(q)\dot{q} \quad (0.13)$$

Ignoring the second-term (due to complexity of modeling) gives $$\ddot{x} \approx J(q)M^{-1}(q)J(q)^T M_x(q)\ddot{x}_{des} \quad (0.14)$$

leading to the following definition of an operation space inertia matrix $$M_x(q) = [J(q)M^{-1}(q)J(q)^T]^{-1} \quad (0.15)$$

that provides $$\ddot{x} \approx \ddot{x}_{des} \quad (0.16)$$

Referring now to (0.7) an exemplary operational space control signal may be written in the joint space as $$\tau_\theta = [J(q)]^T [J(q)M^{-1}(q)J(q)^T]^{-1} \ddot{x}_{des} \quad (0.17)$$

Figure 2:
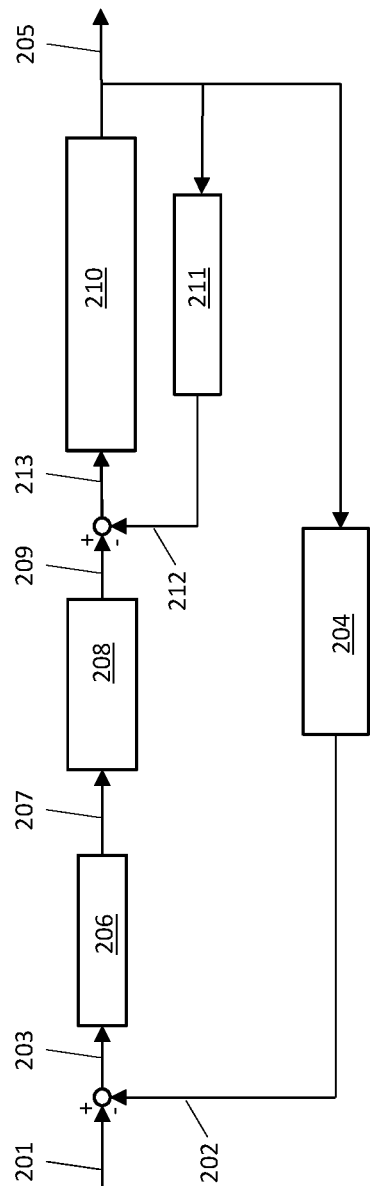
FIG. 2 illustrates another embodiment of the robotic arm controller.

A block diagram of an associated control system for implementing operation space control of a robotic manipulator is given in FIG. 2. The operation of such a control system is now described. A desired operation space trajectory, $x_{des}(t)$, is input at 201 and the actual position of a robot is provided at 202, as determined by a set of equations describing the manipulator kinematics at 204 that take one or more of the robot joint angles (q), joint angle rates ($\dot{q}$), or joint angle accelerations ($\ddot{q}$) at 205 as functional inputs. An error signal is computed and results at 203 at a particular sample rate based on the instantaneous value of the input at 201 and the actual position at 202. The error signal at 203 is processed by a compensator 206 (in this example a simple gain, $K_P$) to give a desired acceleration vector, $\ddot{x}_{des}(t)$, at 207. The desired acceleration vector at 207 is then processed by an operation space control logic, e.g. (0.17), at 208 to provide a vector of joint space control torques, $\tau_\theta(t)$, at 209 that may be applied to control a robot manipulator 210. A stabilizing feedback loop comprising rate compensator 211 that takes one or more of the robot joint angles, joint angle rates, or joint angle accelerations at 205 as inputs is also shown in FIG. 2. This minor loop may be used advantageously to provide an electronic damping signal at 212 that may be added (or subtracted as shown) to a vector of joint space control torques at 209 to enhance the transient performance of the joint space control logic. At FIG. 2, the input 213 to robot manipulator 210 might be vector of input forces $U_q(t)$ with robot manipulator itself 210 performing motion that is consistent with the dynamical model $M(q)\ddot{q}+C(q,\dot{q})\dot{q}=U_q$.

Referring to FIG. 2, operation space control logic 208 may be considered, by one of ordinary skill in the art, as a control allocation logic wherein a set or vector of control variables given in one coordinate system (operation space) are mapped to a set or vector of control variables in a second coordinate system (joint space), which may be a coordinate system having the same dimension or a greater dimension than the dimension of the input coordinates. In the present example, a two-dimensional Cartesian space is mapped to a two-dimensional joint space.

Referring again to (0.17), the matrix $M_x(q)=[J(q)M^{-1}(q)J(q)^T]^{-1}$ must be computed at each sampling instant of the manipulator control system so that a vector of control torques 209 can be determined. In order to compute matrix, $M_x(q)$, the inverse of matrix product $J(q)M^{-1}(q)J(q)^T$ must exist (i.e. $J(q)M^{-1}(q)J(q)^T$ must be invertible). Note that for redundant manipulators, with more degrees of freedom than the degrees of freedom of the task space (e.g. a three-link planar robot operating in a Cartesian plane), a Pseudoinverse is typically used to compute $[J(q)M^{-1}(q)J(q)^T]^{-1}$ in the operation space control logic 208.

One fundamental challenge associated with operation space control as described herein is the fact that the rows of the Jacobian J(q) may lose rank (become singular) so that $J(q)M^{-1}(q)J(q)^T$ cannot be inverted. In this case, it is not possible to compute a control vector in the joint space that produces the necessary operation space forces. A two-link planar manipulator has a singular Jacobian when $\theta_2=0$ and when $\theta_2=\pi$. In these cases, the two links of the manipulator are co-linear and forces cannot be produced in the degenerate direction. This implies that there is no combination of joint torques, $\tau_\theta$, that can produce the desired force vector, $F_x$.

One approach for circumventing the matrix inversion problem is to detect the potential for singularities by identifying degenerate directions and setting the commended force in those directions equal to zero. Generally, this is accomplished by first finding the singular-value decomposition (SVD) of $[M_x(q)]^{-1}=J(q)M^{-1}(q)J(q)^T=VSU^T$ where S is a diagonal matrix of singular values. The operation space inertia matrix is obtained from the SVD computation as $M_x(q)=VS^{-1}U^T$. As part of this process, S must be inverted. Since S is a diagonal matrix, its inverse is found simply by taking the reciprocal of the diagonal elements. When the Jacobian matrix approaches singularity (i.e. when joint angle $\theta_2$ becomes close to 0 or $\pi$), some of the values of S will become very small. Therefore, any values of S that are very small, will have reciprocals that are very large leading to undesirable control actions. To mitigate this, any elements of matrix S that are smaller than a given threshold, $s_{thresh}$, are identified and the corresponding reciprocal set to zero as described in the following pseudocode:

```
1: inputs: q, s_thresh
2: outputs: Mx(q)
3:
4: Mx⁻¹(q) ← J(q)M(q)J(q)ᵀ
5: [U, S, V] ← svd(Mx⁻¹(q))
6: for each s in S do
7:   if s < s_thresh then
8:     s ← 0
9:   else
10:    s ← 1/s
11: Mx(q) = VSUᵀ
```

To illustrate operation space control utilizing the above pseudocode and highlight the advantageous distinctions of the disclosed methodology, a computer simulation of a two-link planar mechanism was done using the above pseudocode and contrasted with the disclosed methodology. The objective was to move a manipulator end-effector from point $P_o=[0.5, 0.2]^T$ to a point $P_f=[-0.4, -0.2]^T$ in the operation space. The control algorithm described above was implemented for a robot model having parameter values given below.

| Parameter | Value |
|---|---|
| $l_1$ | 0.31 m |
| $l_2$ | 0.27 m |
| $r_1$ | 0.11 m |
| $r_2$ | 0.16 m |
| $m_1$ | 1.98 kg |
| $m_2$ | 1.32 kg |
| $I_1$ | 1.5 kg * m² |
| $I_2$ | 0.8 kg * m² |
| $K_P$ | 10 N/m |
| $K_V$ | 3.16 N/m/sec |
| $s_{thresh}$ | 0.00075 |

Figure 3:
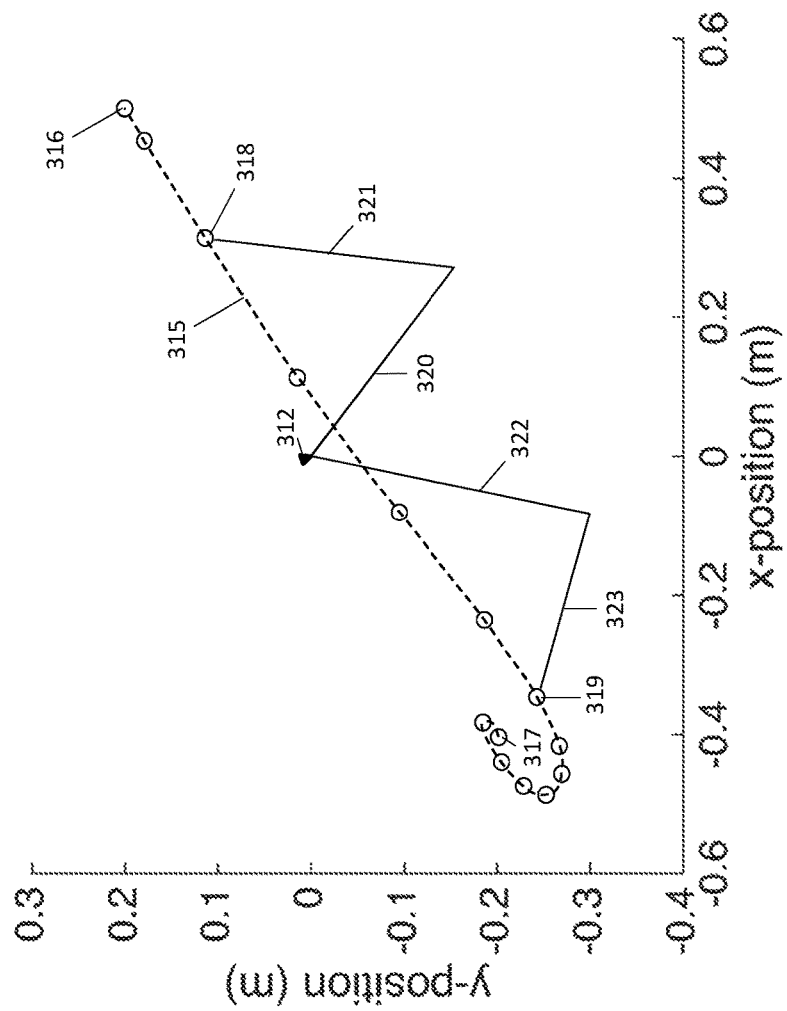
FIG. 3 illustrates end effector and linkage positions in the absence of the disclosed robotic arm controller during an end effector transit.
Figure 4:
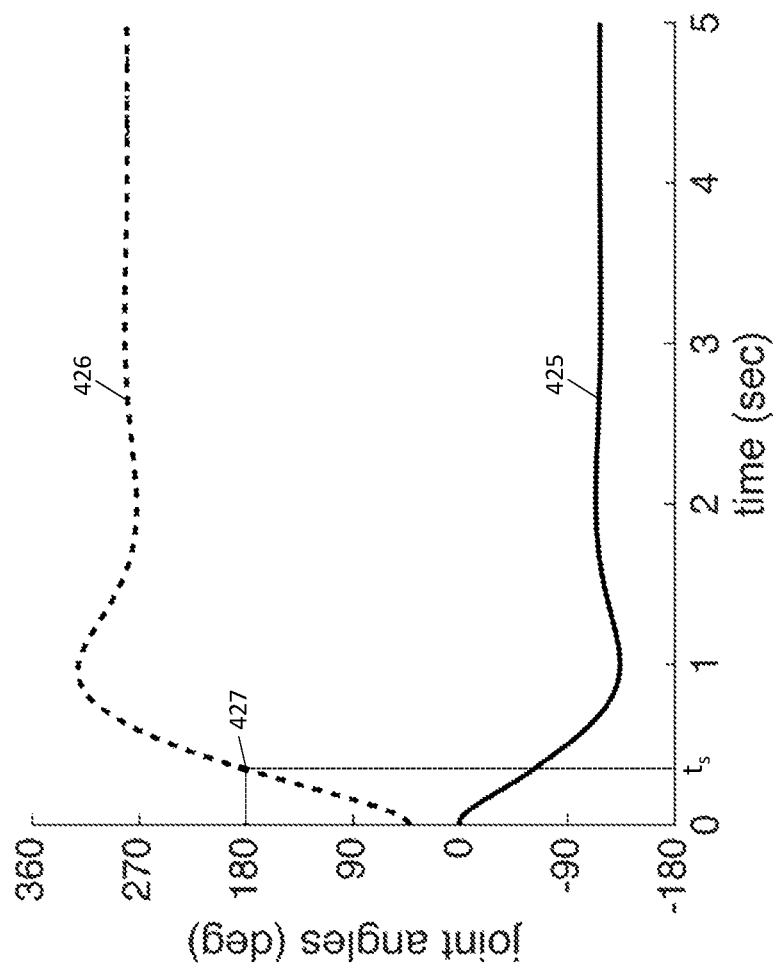
FIG. 4 illustrates resulting joint angles in the absence of the disclosed robotic arm controller during an end effector transit.
Figure 5:
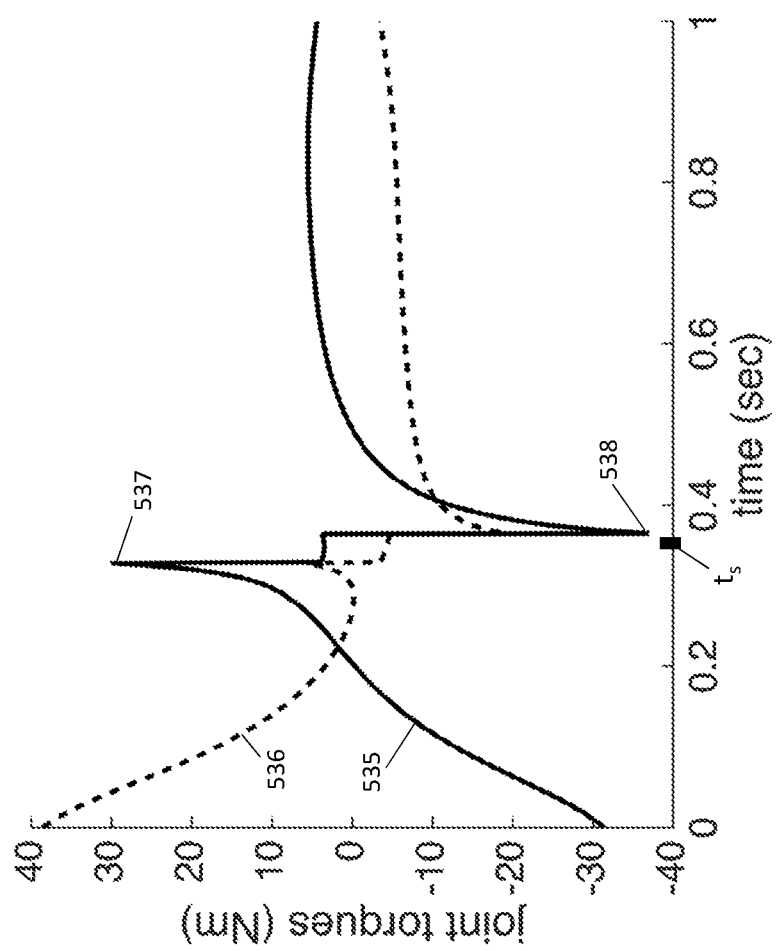
FIG. 5 illustrates resulting joint torques in the absence of the disclosed robotic arm controller during an end effector transit.
Figure 6:
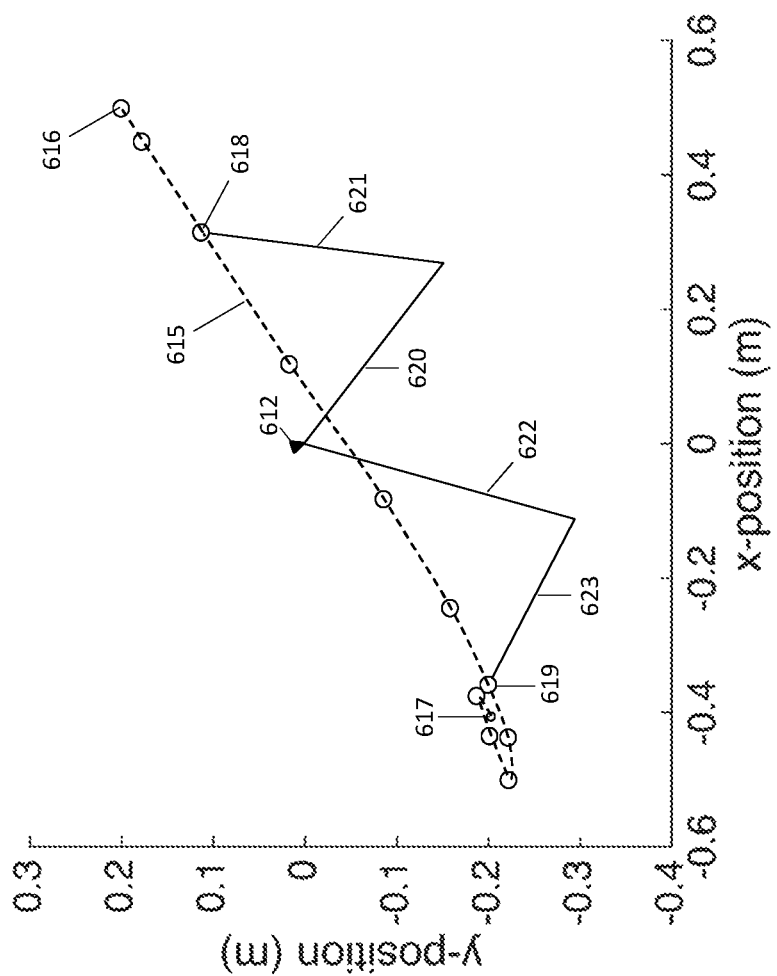
FIG. 6 illustrates end effector and linkage positions generated by the disclosed robotic arm controller during an end effector transit.
Figure 7:
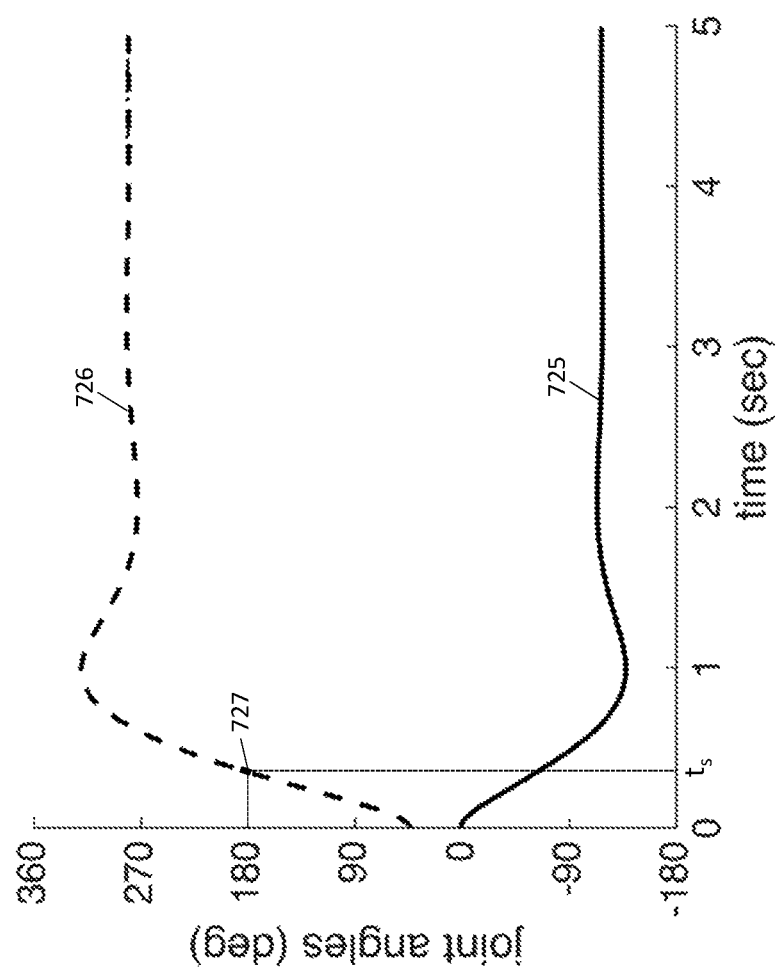
FIG. 7 illustrates resulting joint angles generated by the disclosed robotic arm controller during an end effector transit.
Figure 8:
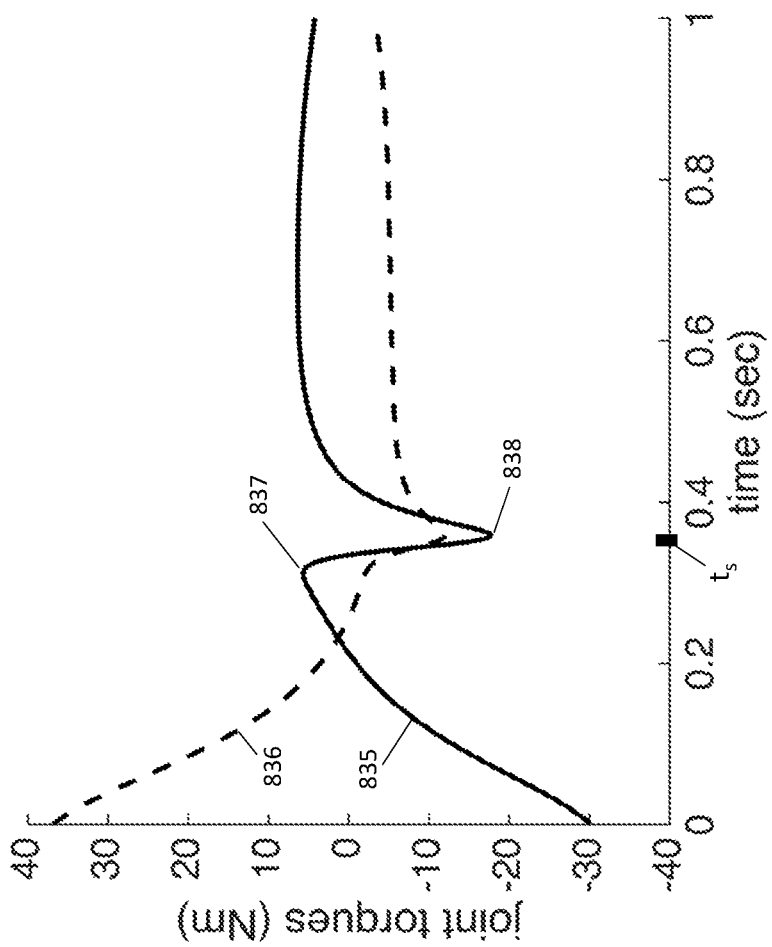
FIG. 8 illustrates resulting joint torques generated by the disclosed robotic arm controller during an end effector transit.

To provide contrast with the disclosed methodology, results of a computer simulation using the above algorithm are initially presented at FIGS. 3-5, and followed by results of a computer simulation using the disclosed methodology, presented at FIGS. 6-8.

At FIG. 3, the motion of the robot manipulator links is depicted (in a time-lapse format) where point $P_o=[0.5, 0.2]^T$ is indicated at 316 and point $P_f=[-0.4, -0.2]^T$ is indicated at 317. A trace of the end-effector path from $P_o$ to $P_f$ is indicated at 315. Selected end effector positions occurring along the transit are additionally indicated as circles, for example at 318 and 319. For reference, link positions are indicated for positions 318 and 319 respectively as 320 (first link) and 321 (second link), and 322 (first link) and 323 (second link), with the first link coupled to foundation 312. FIG. 3 shows that the manipulator slightly overshoots the desired position before settling at the target location. Such overshooting is a characteristic of the control algorithm implemented.

The time-histories of the joint angles corresponding to the robot motion are shown in FIG. 4, with joint angle $\theta_1$ indicated as 425 and joint angle $\theta_2$ indicated as 426. FIG. 4 also shows the angle where the Jacobian becomes singular at 427. Referring to FIG. 4, the joint angle $\theta_2$ passes through 180-degrees at approximately 0.35 seconds, indicated at FIG. 4 as $t_s$. At the instant $\theta_2=180$ degrees, the Jacobian used in the control allocation computation becomes singular. However, by identifying degenerate directions according to the control algorithm above, it is possible to compute a control torque vector (for example at 209 of FIG. 2) that allows the manipulator to pass through the singular angle and complete the desired task.

The time-histories of the resulting control torques are illustrated in FIG. 5 for the period 0-1 second of FIG. 4. Control torque for joint angle $\theta_1$ is indicated as 535 and for joint angle $\theta_2$ indicated as 536. Referring to FIG. 5, it is seen that when the manipulator operates near the singular region (around 0.35 seconds, generally indicated by $t_s$), the values of the computed control torques can change sharply and suddenly. This can be recognized at FIG. 5 by the large change between 537 and 538 which occurs in the neighborhood of $t_s$. It is well known that sudden changes the control torque magnitudes can excite vibrational modes in the manipulator links. This can potentially reduce the accuracy of the robotic control system. In addition, suddenly changing the control torque command may be damaging to the joint actuators and should therefore be avoided where possible. It is therefore advantageous to develop methods that avoid sudden and sharp changes in the manipulator control torques.

To illustrate the advantageous nature of the application of the method of the present disclosure, a second computer simulation was carried out wherein the previous control allocation scheme is replaced with the disclosed method. Specific details of the implementation are discussed below. In brief, the parameters for the manipulator listed previously were used along with the dispersion parameter $\sigma_\theta=10$ degrees, such that the plurality of distributed joint angles evaluated corresponded to joint angles of $\theta_2+\Delta\theta_2$, where $\Delta\theta_2$ was –10, 0, and 10 degrees. Results of the simulation are provided in FIGS. 6-9.

Using the disclosed methodology, the motion of the robot manipulator links is depicted in FIG. 6 from point $P_o=[0.5, 0.2]^T$ at 616 to point $P_f=[-0.4, -0.2]^T$ at 617. A trace of the end-effector path from $P_o$ to $P_f$ is indicated at 615 with selected end effector positions occurring along the transit indicated as circles, for example 618 and 619. For reference, link positions are indicated for positions 618 and 619 respectively as 620 (first link) and 621 (second link), and 622 (first link) and 623 (second link), with the first link coupled to foundation 612. Compared to FIG. 3, FIG. 6 shows that the manipulator follows a different path than the path taken in the previous example, where the disclosed methodology was not employed. The change in the path of the end-effector is the result of the intentional perturbation of the values of the joint angles in the robust control allocation matrix, per the user-selected value of dispersion parameter, $\sigma_\theta$. In effect the new control allocation scheme causes the robot joint angles to be steered differently, which influences the path of the end effector 615 through the operation space.

The time-histories of the joint angles corresponding to the robot motion under the disclosed methodology are shown in FIG. 7, with joint angle $\theta_1$ indicated as 725 and joint angle $\theta_2$ indicated as 726. FIG. 7 also shows the angle where the Jacobian becomes singular at 727. As in the previous simulation, the Jacobian becomes singular at approximately 0.35 seconds when $\theta_2=180$ degrees but by using the disclosed control allocation scheme, the target position can be reached through the application of finite control torques.

The time-histories of the resulting control torques generated by the disclosed control methodology are illustrated in FIG. 8 for the period 0-1 second of FIG. 7. Control torque for joint angle $\theta_1$ is indicated as 835 and for joint angle $\theta_2$ indicated as 836. Referring to FIG. 8, it is evident that the control torque profiles differ in their appearance as compared to the prior control torques of FIG. 5. In particular, it is observed that the overall torque magnitude in the singular region around time $t_s$ has been reduced and that there are no sharp changes in the control torques (compare 837 and 838 of FIG. 8 with 537 and 538 of FIG. 5). Using the disclosed methodology, the smooth changes in the control torques will not excite vibrational modes, and sudden changes in the control torque commands are avoided.

Additional and specific details regarding an implementation of the disclosed control system and methodology are provided as follows:

An instantiation of the method of the present invention applied to solving the operation space control allocation problem in the framework of unscented optimization is now disclosed. Making use of the matrix identity, $(AB)^{-1}=B^{-1}A^{-1}$, equation (0.17) is first rearranged as follows:

$$\ddot{x}_{des}=M_x(q)^{-1}J[(q)^T]^{-1}\tau_\theta = J(q)M(q)^{-1}\tau_\theta \quad (0.18)$$

In (0.18), the control allocation matrix is $W(q)=J(q)M(q)^{-1}$, which may be decomposed and inverted similarly to matrix $M_x(q)$ in (0.15). However, because $J(q)$ is still present in $W(q)$, the possibility of a matrix singularity persists. Recalling that $J(q)$ becomes singular when $\theta_2=0$ or $\theta_2=\pi$, a new approach for solving the control allocation problem is to perturb the value of joint angle $\theta_2$ used in joint space vector $q=[\theta_1, \theta_2]^T$ using unscented sigma points or similar points prior to constructing and inverting the allocation matrix, $W(q)$.

For example, one non-limiting set of sigma points that may be used is $\chi=[-1, 0, +1]$ together with the associated sigma point weights, $w=[\frac{1}{2}, 0, \frac{1}{2}]$. These points represent the first and second order moments of a statistical (uncertain) distribution having mean $\mu=0$ and standard deviation, $\sigma=1$.

In order to perturb the joint space vector in this example, the sigma points are transformed via a standard affine transformation) as follows:

$$\Theta_{2,i}=\theta_2+\sigma_\theta\chi_i, \; i=1, 2, 3 \quad (0.19)$$

where $\sigma_\theta$ represents the standard deviation of the perturbation of the transformed sigma points about the true value of joint angle $\theta_2$. The particular value of $\sigma_\theta$ may be selected by an operator of a robot to reduce the risk of encountering singular control allocations. Substituting the computed sigma points given in (0.19) into the control allocation matrix $W(q)$ gives the following:

$$w(\theta_1, \Theta_{2,1})=J(\theta_1, \Theta_{2,1})M^{-1}(\theta_1, \Theta_{2,1}) \quad (0.20)$$

$$w(\theta_1, \Theta_{2,2})=J(\theta_1, \Theta_{2,2})M^{-1}(\theta_1, \Theta_{2,2}) \quad (0.21)$$

$$w(\theta_1, \Theta_{2,3})=J(\theta_1, \Theta_{2,3})M^{-1}(\theta_1, \Theta_{2,3}) \quad (0.22)$$

In principle, any of $w(\theta_1, \Theta_{2,1})$, $w(\theta_1, \Theta_{2,2})$, or $w(\theta_1, \Theta_{2,3})$ may be inverted to provide a control torque vector, $\tau_\theta$, given $\ddot{x}_{des}$. However, since the inverse mapping may not be one to one, it is possible that $[J(q)M(q)^{-1}]W^{-1}(\theta_1, \Theta_{2,i})\neq \ddot{x}_{des}$ as commanded.

To illustrate this point, consider the case where $\theta_1=-60$ degrees and $\theta_2=180$ degrees with $\ddot{x}_{des}=[-4.20, -1.65]^T$. Assuming for the purpose of the present disclosure that $\sigma_\theta=10$ degrees is selected, and using the robot model parameters utilized for the pervious example, the control allocation matrices are $$W(\theta_1, \Theta_{2,1}) = \begin{bmatrix} 0.1525 & -0.3934 \\ 0.0859 & -0.2908 \end{bmatrix} \quad (0.23)$$

$$W(\theta_1, \Theta_{2,2}) = \begin{bmatrix} 0.1513 & -0.4249 \\ 0.0874 & -0.2453 \end{bmatrix} \quad (0.24)$$

$$W(\theta_1, \Theta_{2,3}) = \begin{bmatrix} 0.1507 & -0.4486 \\ 0.0891 & -0.1953 \end{bmatrix} \quad (0.25)$$

Inverting (0.23), (0.24), and (0.25) gives $$W^{-1}(\theta_1, \Theta_{2,1}) = \begin{bmatrix} 27.55 & -37.27 \\ 8.14 & -14.45 \end{bmatrix} \quad (0.26)$$

$$W^{-1}(\theta_1, \Theta_{2,2}) = \text{singular} \quad (0.27)$$

$$W^{-1}(\theta_1, \Theta_{2,3}) = \begin{bmatrix} -18.50 & 42.50 \\ -8.44 & 14.27 \end{bmatrix} \quad (0.28)$$

from which $$\tau_{\theta,1} = W^{-1}(\theta_1, \Theta_{2,1})\ddot{x}_{des} = \begin{bmatrix} -54.1 \\ -10.3 \end{bmatrix} (Nm) \quad (0.29)$$

$$\tau_{\theta,2} = W^{-1}(\theta_1, \Theta_{2,2})\ddot{x}_{des} = \begin{bmatrix} \infty \\ \infty \end{bmatrix} (Nm) \quad (0.30)$$

$$\tau_{\theta,3} = W^{-1}(\theta_1, \Theta_{2,3})\ddot{x}_{des} = \begin{bmatrix} 7.43 \\ 11.86 \end{bmatrix} (Nm) \quad (0.31)$$

Clearly only the solutions $\tau_{\theta,1}$ and $\tau_{\theta,1}$ represent reasonable choices for the control torques. Applying $\tau_{\theta,1}$ to control the manipulator gives $$[J(q)M(q)^{-1}]W^{-1}(\theta_1, \Theta_{2,1})\ddot{x}_{des}=[-3.81, -2.20]^T\approx\ddot{x}_{des} \quad (0.32)$$

whereas application of $\tau_{\theta,3}$ to control the manipulator gives $$[J(q)M(q)^{-1}]W^{-1}(\theta_1, \Theta_{2,1})\ddot{x}_{des}=[-3.31, -2.60]^T\approx\ddot{x}_{des} \quad (0.33)$$

While the control torque vectors given by (0.29) or (0.31) could be applied to control the robot, it is not immediately apparent what the best choice is.

By the method of the present disclosure, we may now construct an unscented optimization problem with the goal of minimizing the risk of encountering a singular control allocation (viz. a robust solution to the control allocation problem) as follows.

Let $A(p)$ be an $n\times m$ uncertain matrix parameterized by $p\in\text{supp}(p)$. In the present application, $A(p)=W(q)$ where $q=[\theta_1, \Theta_2]^T$ with $\Theta_2=\theta_2+\Delta_\theta$ defined to mean the perturbed value of joint angle $\theta_2$ where the perturbation, $\Delta_\theta$, is modeled as an uncertain parameter having an arbitrary cumulative joint density function, $C$, the latter having support, $\text{supp}(\Delta_\theta)$, as selected by an operator of the disclosed process. The objective is to solve a robust control allocation problem $A(p)x=b$ for all values of the parameters in the support of p. One non-limiting solution to a robust control allocation is given as Minimize $\int 0.5(z(p)^T z(p)) dC(p)$ supp(p)

Subject to $A(p)x-b=z(p)$ \quad (0.34)

Where, in (0.34), the variables $z(p)$ can be interpreted as residual variables so that the solution to (0.34) minimizes the 2-norm, $\|A(p)x-b\|_2$.

The solution to problem (0.34), which may be effected by any approach selected by a user of the present disclosure, yields $\tau_\theta^*=[-23.33, 0.78]^T$ (Nm) which admits the following minimum norm solution $[J(q)M(q)^{-1}]\tau_\theta^*=[-3.86, -2.23]^T \approx \ddot{x}_{des}$. To illustrate one non-limiting solution approach, problem (0.34) may be discretized—using the concept of Sigma points or similar sample points—as follows:

$$\text{Minimize} \quad \sum_{i=1}^{N} w_i \frac{z_i(\chi_i)^T z_i(\chi_i)}{2} \tag{0.35}$$

$$\text{Subject to} \quad \begin{aligned} w_1(A_1 x - b - z_1) &= 0 \\ w_2(A_2 x - b - z_2) &= 0 \\ &\vdots \\ w_N(A_N x - b - z_N) &= 0 \end{aligned}$$

A Lagrangian function for a discretized problem (0.35) is given as $$L = w_1 \frac{z_1^T z_1}{2} + w_2 \frac{z_2^T z_2}{2} + \ldots + w_N \frac{z_N^T z_N}{2} + \lambda_1^T w_1 (A_1 x - b - z_1) + \lambda_2^T w_2 (A_2 x - b - z_2) + \ldots + \lambda_N^T w_N (A_N x - b - z_N) \tag{0.36}$$

To minimize the objective function partial derivatives $$\frac{\partial L}{\partial z_i} = 0$$

and $$\frac{\partial L}{\partial x} = 0$$

must be solved.

The solution to $$\frac{\partial L}{\partial z_i} = 0$$

is $$\frac{\partial L}{\partial z_i} = w_i z_i - w_i \lambda_i = 0 \tag{0.37}$$

leading to $z_i = \lambda_i$.

Partial derivative $$\frac{\partial L}{\partial x} = 0$$

is $$\frac{\partial L}{\partial x} = w_1 A_1^T \lambda_1 + w_2 A_2^T \lambda_2 + \ldots + w_N A_N^T \lambda_N = 0 \tag{0.38}$$

Substituting $A_i x - b = \lambda_i$ into (0.38) leads to $$(w_1 A_1^T A_1 + w_2 A_2^T A_2 + \ldots + w_N A_N^T A_N) x = w_1 A_1^T b + w_2 A_2^T b + \ldots + w_N A_N^T b \tag{0.39}$$

which may be solved for the unknown vector x. The solution of (0.39) is a robust allocation of a control vector b given in a m-dimensional space to a control vector x given in an n-dimensional space.

Note that in the sense of the limit, (0.39) implies $$\left( \int_{supp(p)} A^T(p) A(p) dC(p) \right) x = \int_{supp(p)} A^T(p) b \, dC(p) \tag{0.40}$$

so that a solution for robust control allocation is given as $$x_{robust} = \left( \int_{supp(p)} A^T(p) A(p) dC(p) \right)^{-1} \left( \int_{supp(p)} A^T(p) dC(p) \right) b \tag{0.41}$$

It may be further observed that in light of (0.41), the solution to problem (0.34) can be interpreted as finding a left matrix inverse, i.e. wherein $A_{left}^{-1} = (A^T A)^{-1} A^T$ wherein A is the matrix concatenation $A = [w_1 A_1 | w_2 A_2 | \ldots | w_N A_N]^T$. Thus, a simple non-limiting algorithm for solving a manipulator operation space control allocation problem can be described by a pseudocode expressed in Algorithm 2 below.

```
 1: inputs: q, ẍ_des, σ_θ, χ, w
 2: outputs: τ_θ*
 3:
 4: A ← 0
 5: b ← 0
 6: i ← 1
 7:
 8: for each χ in χ do
 9:     Θ ← q + σ_θ χ
10:     A ← concatenate [A; w_i J(Θ)M^{-1}(Θ)]
11:     b ← concatenate [b; w_i ẍ_des]
12:     i ← i + 1
13:
14: A_left^{-1} = (A^T A^{-1}) A^T
15: τ_θ* = A_left^{-1} b
```

For the exemplary robotics control problem described herein, application of Algorithm 2 yields the following intermediate calculations when $q=[\theta_1, \theta_2]^T$ with $\theta_1 = -60$ degrees and $\theta_2 = 180$ degrees and with $\ddot{x}_{des} = [-4.20, -1.65]^T$ and assuming that $\sigma_\theta = 10$ degrees and with exemplary Sigma points and weight given as $\chi = [+1, 0, -1]$ and $w = [½, 0, ½]$.

For i=1:

$$\Theta = \begin{bmatrix} -60 \frac{\pi}{180} \\ 180 \frac{\pi}{180} \end{bmatrix} + 10 \frac{\pi}{180} \begin{bmatrix} 0 \\ 1 \end{bmatrix} = \begin{bmatrix} -1.0472 \\ 3.3161 \end{bmatrix}$$

$$A = \frac{1}{2} \begin{bmatrix} 0.1525 & -0.3934 \\ 0.0859 & -0.2908 \end{bmatrix}$$

$$b = \frac{1}{2} \begin{bmatrix} -4.20 \\ -1.65 \end{bmatrix}$$

For i=2:

$$\Theta = \begin{bmatrix} -60\frac{\pi}{180} \\ 180\frac{\pi}{180} \end{bmatrix} + 10\frac{\pi}{180}\begin{bmatrix} 0 \\ 0 \end{bmatrix} = \begin{bmatrix} -1.0472 \\ 3.1416 \end{bmatrix}$$

$$A = \begin{bmatrix} \frac{1}{2}\begin{bmatrix} 0.1525 & -0.3934 \\ 0.0859 & -0.2908 \end{bmatrix} \\ 0\begin{bmatrix} 0.1513 & -0.4249 \\ 0.0874 & -0.2453 \end{bmatrix} \end{bmatrix}$$

$$b = \begin{bmatrix} \frac{1}{2}\begin{bmatrix} -4.20 \\ -1.65 \end{bmatrix} \\ 0\begin{bmatrix} -4.20 \\ -1.65 \end{bmatrix} \end{bmatrix}$$

For i=3:

$$\Theta = \begin{bmatrix} -60\frac{\pi}{180} \\ 180\frac{\pi}{180} \end{bmatrix} + 10\frac{\pi}{180}\begin{bmatrix} 0 \\ -1 \end{bmatrix} = \begin{bmatrix} -1.0472 \\ 2.9671 \end{bmatrix}$$

$$A = \begin{bmatrix} \frac{1}{2}\begin{bmatrix} 0.1525 & -0.3934 \\ 0.0859 & -0.2908 \end{bmatrix} \\ 0\begin{bmatrix} 0.1513 & -0.4249 \\ 0.0874 & -0.2453 \end{bmatrix} \\ \frac{1}{2}\begin{bmatrix} 0.1507 & -0.4486 \\ 0.0891 & -0.1953 \end{bmatrix} \end{bmatrix}$$

$$b = \begin{bmatrix} \frac{1}{2}\begin{bmatrix} -4.20 \\ -1.65 \end{bmatrix} \\ 0\begin{bmatrix} -4.20 \\ -1.65 \end{bmatrix} \\ \frac{1}{2}\begin{bmatrix} -4.20 \\ -1.65 \end{bmatrix} \end{bmatrix}$$

The associated left matrix inverse is $$A_{left}^{-1} = (A^T A)^{-1} A^T = \begin{bmatrix} 27.5523 & -37.2703 & 0 & 0 & -18.5008 & 42.4861 \\ 8.1384 & -14.4472 & 0 & 0 & -8.4424 & 14.2717 \end{bmatrix}$$

so that $$\tau_\theta^* =$$

$$A_{left}^{-1} b = \begin{bmatrix} 27.5523 & -37.2703 & 0 & 0 & -18.5008 & 42.4861 \\ 8.1384 & -14.4472 & 0 & 0 & -8.4424 & 14.2717 \end{bmatrix} \begin{bmatrix} -2.1000 \\ -0.8268 \\ 0 \\ 0 \\ -2.1000 \\ -0.8268 \end{bmatrix} =$$

$$\begin{bmatrix} -23.3288 \\ 0.7834 \end{bmatrix}$$

To illustrate the advantageous nature of the application of the method of the present invention to an operation space control problem in robotics, the second computer simulation illustrated at FIGS. 6-8 was carried out using the disclosed method. The parameters for the manipulator listed previously were used along with the dispersion parameter $\sigma_\theta$=10 degrees. As previously noted, the motion of the robot manipulator links using the new control allocation algorithm is depicted (in a time-lapse format) in FIG. 6 along with a trace of the end-effector path as 615 (dashed line). FIG. 6 shows that the manipulator follows a different path than the path taken using the typically and currently used methodology. The change in the path of the end-effector is the result of the intentional perturbation of the values of the joint angles in the robust control allocation matrix, per the user-selected value of dispersion parameter, $\sigma_\theta$. In effect the new control allocation scheme causes the robot joint angles to be steered differently through the operation space. The time-histories of the joint angles corresponding to the robot motion are shown in FIG. 7. FIG. 7 shows the angle where the Jacobian becomes singular (dash-dot line). As in the previous simulation conducted with a typically used methodology, the Jacobian becomes singular at 727 at approximately 0.35 seconds when $\theta_2$=180 degrees but by using the new control allocation scheme disclosed here, the target position can be reached through the application of finite control torques. The time-histories of the control torques are shown in FIG. 8. Comparing FIG. 8 and FIG. 5, it is evident that the control torque profiles differ in their appearance as compared to typically utilized methodologies. In particular, it is observed that the overall torque magnitude in the singular region has been reduced and that there are no sharp changes in the control torques (compare 537 to 538 with 837 to 838). In this sense, the control torques determined by the method of the present invention are better suited for implantation: (i) the smooth changes in the control torques will not excite vibrational modes, and (ii) sudden changes in the control torque commands (which may be damaging to the manipulator actuators) are avoided. It is evident from the simulation results that the application of the method for unscented optimization disclosed herein can be applied advantageously to an exemplary problem in the field of robotic operation space control.

Application to Solving Uncertain Optimization Problems and Chance Constrained Programming Problems A generic chance-constrained programming problem is typically posed as a problem (C):

$$x \in \mathbb{R}^{N_x}, p \in supp(p) \subseteq \mathbb{R}^{N_p}$$

Minimize $Y(x)$ x

Subject to: $Pr\{c(x,p) \leq 0\} \geq 1-r$

Where p is an uncertain parameter with support supp(p) and $r \in [0,1]$ is a given number called the risk level. The risk level, r, is connected to the reliability level, R, by the simple equation: r+R=1.

Chance-constrained programming is part of a broader class of stochastic programming problems that have been widely studied in operations research since the 1950s. Only in recent years has this problem made its entry in engineering applications. A major challenge in solving Problem C is the computation of the function: $Y(x) := Pr\{c(x, p) \leq 0\}$. If y(x) were to be easily computable, then problem C is the simple scalar-constrained problem, $x \in \mathbb{R}^{N_x}$ Minimize Y(x)

Subject to: y(x)≥R

In other words, the difficulty associated with problem C is largely in the formulation of the problem; i.e., the computation of y(x).

The unscented transform, introduced by Julier et al, is a computationally simple method for transforming a given mean $\mu_p \in \mathbb{R}^{N_p}$ and covariance $\Sigma_p \in \mathbb{R}^{N_p \times N_p}$. The transform has been applied primarily for nonlinear filtering and estimation in the form of an unscented Kalman filter. The basic idea behind the unscented transform is to replace the distribution of p by a deterministically chosen set of points and weights $\{P_j \in \mathbb{R}^{N_p}, w_j \in \mathbb{R}, j=1, \ldots, n_s\}$ called sigma points, such that their (weighted) "discrete" mean and covariance are match perfectly to $\mu_p$ and $\Sigma_p$ respectively. In porting this elegant concept from Kalman filtering to optimization, we define unscented optimization as the problem where the probabilistic constraints are imposed in a deterministic manner over each of the sigma points:

$x \in \mathbb{R}^{N_x}$

Minimize Y(x)

x

Subject to: $c(x, P_1) \le 0$ $c(x, P_1) \le 0$

. . .

$c(x, P_n) \le 0$

The resulting solution $x^U$, called the unscented solution, is used to determine a risk level, r, or a reliability level, R, a posteriori.

Let E(p) be an exemplary uncertain parameterized optimization problem for the non-limiting case of an uncertain parameterized optimization problem having a single uncertain parameter p~N(2.0, 0.4²) where notation N(a, b²) implies that the distribution of p is Normal (Gaussian) with a mean, $\mu_p$=a, and standard deviation, $\sigma_p$=b. The exemplary problem E(p) is written as $$x := (x_1, x_2) \in \mathbb{R}^2 \quad p \in \mathbb{R}$$

$$(E(p)) \begin{cases} \text{Minimize}_x & Y(x) := x_1 + x_2 \\ \text{Subject to} & c(x, p) := x_1^2 + x_2^2 - p^2 \le 0 \end{cases}$$

Using standard optimization techniques, problem E(p) is solved by selecting a nominal value for p, for example $p_o = \mu_p = 2$. Solving $E(p_o)$ gives $x_1 = x_2 = -2\sqrt{2}$ and $\Pr\{c(x, p) \le 0\} = 0.5$. That is, the exemplary constraint $x_1^2 + x_2^2 - p^2 \le 0$ of problem E(p) will be violated 50% of the time over the support of p leading to a risk level of r=0.5.

The following may be performed for obtaining a "less risky" solution:

Obtain the sigma points for the uncertain parameters. For p~N(2.0, 0.4²) as described above, Julier's spherical simplex method gives, $P_1$=1.6, $P_2$=2, $P_3$=2.4.

Replace constraint c(x, p) with a new set of constraints $c_1(x, P_1), c_2(x, P_2), \ldots, c_n(x, P_n)$ using the sigma points from step 1 as deterministic parameter values. In an exemplary problem, n=3 sigma points are used giving:

$$[c(x, p) = x_1^2 + x_2^2 - p^2 \le 0] \to \begin{bmatrix} c_1(x, P_1) = x_1^2 + x_2^2 - P_1^2 \le 0 \\ c_2(x, P_2) = x_1^2 + x_2^2 - P_2^2 \le 0 \\ c_3(x, P_3) = x_1^2 + x_2^2 - P_3^2 \le 0 \end{bmatrix}$$

Rewrite the original optimization problem E(p) by replacing the original constraints with the new set of constraints determined previously. This new problem is referred to as an unscented transcription of problem E(p). The new unscented optimization problem $E^U$ is given for the present example as:

$$x := (x_1, x_2) \in \mathbb{R}^2$$

$$(E^U) \begin{cases} \text{Minimize}_x & Y(x) := x_1 + x_2 \\ \text{Subject to} & c(x, p_1) := x_1^2 + x_2^2 - P_1^2 \le 0 \\ & c(x, p_2) := x_1^2 + x_2^2 - P_2^2 \le 0 \\ & c(x, p_3) := x_1^2 + x_2^2 - P_3^2 \le 0 \end{cases}$$

Solve the unscented problem using standard optimization techniques. The solution to the exemplary unscented optimization problem $E^U$ is $x_1 = x_2 = -1.1314$. Using the new solution, the constraint function is given as $x_1^2 + x_2^2 - p^2 = 2.56 - p^2 \le 0$.

The a posteriori risk, r, may be evaluated by any suitable means, for example Monte Carlo analysis. In the case of the exemplary problem $E^U$, it can be shown that $\Pr\{c(x_1 = -1.1314, x_2 = -1.1314, p) \le 0\} = 0.84$. The solution to the unscented problem therefore has a risk of (1-0.84)*100%=16% whereas the solution to the "nominal" problem wherein the nominal value for p, for example $p_o = \mu_p = 2$ was selected to give the solution where x1=x2=−1.414 has a risk of 50%.

Figure 9:
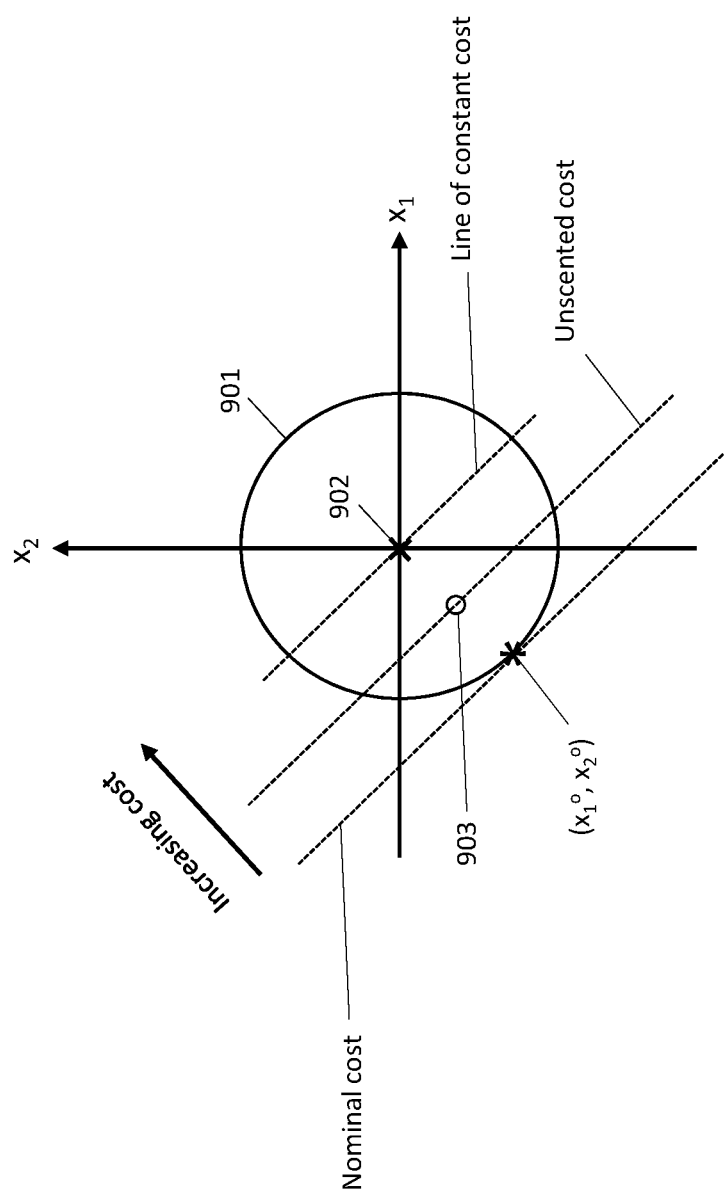
FIG. 9 illustrates a solution for the control allocation method.

The mechanism for the improvement in the reliability (viz. reduction in risk) of the solution to the exemplary unscented optimization problem is illustrated in FIG. 9, which shows the space of the decision variables, $x_1$ and $x_2$. In FIG. 9, the circle 901 centered on the origin 902 represents the constraint set for the Problem E(p) for the nominal value for p, in this case $p_o = \mu_p = 2$. Also shown in FIG. 9 are lines of constant cost (e.g. Nominal cost, Unscented cost) and the direction of increasing cost (Increasing cost) in the space of decision variables. The nominal solution $(x_1^o, x_2^o) = (-1.414, -1.414)$, is on the boundary of the constraint set which coincides with the Line of constant cost associated with the minimum cost for the nominal solution, that is, Y(x)=−2.83. In FIG. 9, another solution point 903 is also shown that corresponds to the unscented solution $(x_1^U, x_2^U) = (-1.1314, -1.1314)$. Referring to FIG. 9, it is seen that the unscented solution lies within the boundary of the constraint set and away from the constraint boundary so that the risk of violating the constraint boundary is reduced. The cost of the unscented solution, Y(x)=−2.26, is slightly larger than the cost for the nominal case, Y(x)=−2.83. The increase in cost is interpreted as the "price to be paid" for the risk reduction (enhanced reliability) associated with the unscented solution. The zero-risk solution is admitted when the optimal point is at the origin 902 giving Y(x)=0. In this case, r=0% or equivalently R=100%.

In the case of the robotic arm controller presented here, an abstraction of the constraint boundary 902 of FIG. 9 can be interpreted as the boundary of the constraint set for which the robot manipulator Jacobian becomes singular. Thus, by constructing and solving an appropriate version of an unscented optimization problem, it is possible to obtain a solution that moves the optimal point away from the constraint boundary. In the context of the robotic arm controller presented here, moving the optimal point away from the constraint boundary implies that the control parameter x determined by the robotic arm controller will lie within the boundary of the constraint set and hence reduce the risk of encountering a singular solution. As a result a control allocation that is robust to singularities will be achieved. The attendant increase in cost, associated with the robust control allocation, is the error in the solution to Ax=b as measured by an appropriate error function.

Thus, the disclosed robotic arm controller presented here is an example of an uncertain parameterized optimization problem as described in the preceding paragraphs. Furthermore, the solution to an uncertain parameterized optimization problem provides a robotic arm controller which determines a control parameter x for moving an end effector of a robotic arm from an initial point to a subsequent point. The control parameter x is determined by a novel methodology of utilizing a control equation having the general form Ax=b and evaluation of a feedback equation, where the solution to the control equation is located by perturbing at least one joint angle appearing in the Jacobian of the robotic arm to generate a plurality of distributed joint angles. The methodology disclosed then determines the control parameter x by determining a value for the control parameter x which minimizes an error function, where the error function comprises each error generated by each joint angle in the selected plurality of distributed joint angles. In a particular embodiment, the error function is sum of residual squares, and the appropriate control parameter x is determined by minimizing the error function subject to a series of constraints $A_i x - b - z_i = 0$, where each constraint arises by virtue of the error generated through use of a given joint angle in the plurality of distributed joint angles selected.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A control system for a robotic arm comprising:
   a robotic arm comprising at least one link and comprising an end effector;
   a group of sensors attached to the robotic arm where the group of sensors comprises one or more sensors and where the group of sensors provides one or more signals describing at least one joint angle established by the robotic arm;
   a group of actuators attached to the robotic arm where the group of actuators comprises one or more actuators and where the group of actuators is configured to generate motion of the at least one link comprising the robotic arm; and
   a processor in communication with the group of sensors and the group of actuators and configured to perform steps comprising:
   communicating with the group of sensors and determining an actual position, where the actual position is a position of the end effector at a given time t;
   determining a desired position, where the desired position is a prescribed position of the end effector at the given time t;
   evaluating a feedback equation for the end effector, where the feedback equation comprises the desired position and the actual position of the end effector and determining an end effector parameter b using the feedback equation, where the end effector parameter b describes a condition at the end effector of the robotic arm;
   determining a prospective control parameter x for at least one actuator in the group of actuators by using a transformation matrix $A_o$ and the end effector parameter b, where the transformation matrix $A_o$ comprises at least one parameter having a value dependent on the value of the at least one joint angle established by the robotic arm, by performing steps comprising:
   selecting a plurality of distributed joint angles; and
   minimizing an error function, where the error function comprises a plurality of errors, and where a quantity of errors in the plurality of errors is equal to a quantity of joint angles in the plurality of distributed joint angles, and where each error in the plurality of errors corresponds to a specific joint angle in the plurality of distributed joint angles, where the each error comprises a specific transformation matrix $A_i$, the prospective control parameter x, and the end effector parameter b, where the specific transformation matrix A, is the transformation matrix $A_o$ when the specific joint angle is utilized as the at least one joint angle, thereby determining the prospective control parameter x; and
   communicating the prospective control parameter x to the at least one actuator in the group of actuators;
   and controlling the at least one actuator in the group of actuators using the prospective control parameter x.

2. The control system of claim 1 where the at least one link comprising the robotic arm establishes the at least one joint angle in a joint space and where the desired position of the end effector is referenced to a coordinate system in a task space, and where the transformation matrix $A_o$ comprises a manipulator Jacobian comprising the at least one joint angle.

3. The control system of claim 2 where an absolute value of the error function decreases as a summation of the individual errors comprising the error function decreases.

4. The control system of claim 3 where the each error comprises the specific transformation matrix $A_i$ multiplied by the prospective control parameter x and minus the end effector parameter b.

5. The control system of claim 1 where the processor is additionally configured to perform steps comprising communicating with the group of sensors and determining an actual joint angle, where the actual joint angle is the at least one joint angle established by the robotic arm at the given time t, and where the actual joint angle defines a probability function ($\mu$, $\sigma^2$), where the $\mu$ is the actual joint angle and the $\sigma$ is less than or equal to 10 degrees, and where each specific joint angle in the plurality of distributed joint angles satisfies a relationship $0.8 \leq \theta/\theta_M \leq 1.2$, where the $\theta$ is the each specific joint angle in the plurality of distributed joint angles and the $\theta_M$ is an angle on the probability function ($\mu$, $\sigma^2$).

6. The control system of claim 5 where the $\theta_M$ is a single angle in a plurality of $\theta_M$ where a quantity of $\theta_M$ in the plurality of $\theta_M$ is equal to the quantity of distributed joint angles in the plurality of distributed joint angles, and where each $\theta_M$ is a sigma point of the probability function ($\mu$, $\sigma^2$).

7. The control system of claim 6 where the each error is equal to a $z_i$ and where $A_i x - b = z_i$, where $A_i$ is the specific transformation matrix when the specific joint angle corresponding to the each error is utilized as the at least one joint angle, and where x is the prospective control parameter x, and where b is the end effector parameter b, such that the error function is minimized subject to $A_i x - b = z_i$ for every error in the plurality of errors.

8. The control system of claim 7 where the error function is a residual sum of squares of every error in the plurality of errors.

9. The control system of claim 1 where the plurality of links comprising the robotic arm establishes a plurality of joint angles in a joint space and where the desired position of the end effector is referenced to a coordinate system in a task space, and where the transformation matrix A comprises a manipulator Jacobian comprising the plurality of joint angles.

10. The control system of claim 9 where the transformation matrix $A_o$ is a first matrix having a quantity of rows equal to an integer n and quantity of columns equal to an integer m, the prospective control parameter x is a second matrix having a single column and a quantity of rows equal to the integer m, and the end effector parameter b is a third matrix having one column and the quantity of rows equal to the integer n.

11. A computer implemented method of controlling a robotic arm comprising:
receiving in a processor one or more signals describing at least one joint angle established by a robotic arm, where the robotic arm comprises at least one link and comprises an end effector, and where the robotic arm comprises a group of actuators attached to the robotic arm where the group of actuators comprises one or more actuators and where the group of actuators is configured to generate motion of the at least one link comprising the robotic arm;
utilizing the one or more signals to determine an actual position of the end effector, where the actual position is a position of the end effector at a given time t;
determining a desired position, where the desired position is a prescribed position of the end effector at the given time t;
evaluating a feedback equation, where the feedback equation comprises the desired position and the actual position of the end effector and determining an end effector parameter b using the feedback equation, where the end effector parameter b describes a condition at the end effector of the robotic arm;
determining a prospective control parameter x for at least one actuator in the group of actuators by using a transformation matrix $A_o$ and the end effector parameter b, where the transformation matrix $A_o$ comprises at least one parameter having a value dependent on the value of the at least one joint angle established by the robotic arm, by performing steps comprising:
selecting a plurality of distributed joint angles; and
minimizing an error function, where the error function comprises a plurality of errors, and where a quantity of errors in the plurality of errors is equal to a quantity of joint angles in the plurality of distributed joint angles, and where each error in the plurality of errors corresponds to a specific joint angle in the plurality of distributed joint angles, where the each error comprises a specific transformation matrix $A_i$, the prospective control parameter x, and the end effector parameter b, where the specific transformation matrix $A_i$, is the transformation matrix $A_o$ when the specific joint angle is utilized as the at least one joint angle, thereby determining the prospective control parameter x; and
communicating the prospective control parameter x to the at least one actuator in the group of actuators;
and controlling the at least one actuator in the group of actuators using the prospective control parameter x.

12. The computer implemented method of claim 11 where the at least one link comprising the robotic arm establishes the at least one joint angle in a joint space and where the desired position of the end effector is referenced to a coordinate system in a task space, and where the transformation matrix $A_o$ comprises a manipulator Jacobian comprising the at least one joint angle.

13. The computer implemented method of claim 12 where an absolute value of the error function decreases as a summation of the individual errors comprising the error function decreases.

14. The computer implemented method of claim 13 further comprising the processor communicating with a group of sensors comprising one or more sensors and providing one or more signals describing the at least one joint angle established by the robotic arm, and the processor determining an actual joint angle, where the actual joint angle is the at least one joint angle established by the robotic arm at the given time t, and where the actual joint angle defines a probability function ($\mu$, $\sigma^2$), where the $\mu$ is the actual joint angle and the $\sigma$ is less than or equal to 10 degrees, and where each specific joint angle in the plurality of distributed joint angles satisfies a relationship $0.8 \leq \theta/\theta_M \leq 1.2$, where the $\theta$ is the each specific joint angle in the plurality of distributed joint angles and the $\theta_M$ is an angle on the probability function ($\mu$, $\sigma^2$).

15. The computer implemented method of claim 14 where the $\theta_M$ is a single angle in a plurality of $\theta_M$ where a quantity of $\theta_M$ in the plurality of $\theta_M$ is equal to the quantity of distributed joint angles in the plurality of distributed joint angles, and where each $\theta_M$ is a sigma point of the probability function ($\mu$, $\sigma^2$).

16. The computer implemented method of claim 14 where the each error comprises the specific transformation matrix $A_i$ multiplied by the prospective control parameter x and minus the end effector parameter b.

17. A control system for a robotic arm comprising:
a robotic arm comprising at least one link and comprising an end effector;
a group of sensors attached to the robotic arm where the group of sensors comprises one or more sensors and where the group of sensors provides one or more signals describing at least one joint angle established by the robotic arm, where the one or more signals is referenced to a coordinate system in a joint space;
a group of actuators attached to the robotic arm where the group of actuators comprises one or more actuators and where the group of actuators is configured to generate motion of the at least one link comprising the robotic arm; and a processor in communication with the group of sensors and the group of actuators and configured to perform steps comprising:

communicating with the group of sensors and determining an actual position, where the actual position is a position of the end effector at a given time t;

determining a desired position, where the desired position is a prescribed position of the end effector at the given time t, where the desired position of the end effector is referenced to a coordinate system in a task space;

evaluating a feedback equation for the end effector, where the feedback equation comprises the desired position and the actual position of the end effector and determining an end effector parameter b using the feedback equation, where the end effector parameter b describes a condition at the end effector of the robotic arm;

determining a prospective control parameter x in the task space for at least one actuator in the group of actuators by using a transformation matrix $A_o$ and the end effector parameter b, where the transformation matrix $A_o$ comprises a manipulator Jacobian comprising the at least one joint angle in the joint space, by performing steps comprising:

communicating with the group of sensors and determining an actual joint angle, where the actual joint angle is the at least one joint angle established by the robotic arm at the given time t;

defining a probability function $(\mu, \sigma^2)$, where the $\mu$ is the actual joint angle and the $\sigma$ is less than or equal to 10 degrees;

selecting a plurality of distributed joint angles where each specific joint angle in the plurality of distributed joint angles satisfies a relationship $0.8 \leq \theta/\theta_M \leq 1.2$, where the $\theta$ is the each specific joint angle in the plurality of distributed joint angles and the $\theta_M$ is an angle on the probability function $(\mu, \sigma^2)$; and minimizing an error function, where the error function comprises a plurality of errors, and where a quantity of errors in the plurality of errors is equal to a quantity of joint angles in the plurality of distributed joint angles, and where each error in the plurality of errors corresponds to a specific joint angle in the plurality of distributed joint angles, where the each error comprises a specific transformation matrix $A_i$, the prospective control parameter x, and the end effector parameter b, where the specific transformation matrix $A_i$, is the transformation matrix $A_o$ when the specific joint angle is utilized as the at least one joint angle, where an absolute value of the error function decreases as a summation of the each individual errors in the plurality of errors comprising the error function decreases, and where the end effector parameter b is referenced in the task space, thereby determining the prospective control parameter x in the task space; and communicating the prospective control parameter x to the at least one actuator in the group of actuators;

and controlling the at least one actuator in the group of actuators using the prospective control parameter x.

18. The control system of claim 17 where the $\theta_M$ is a single angle in a plurality of $\theta_M$ where a quantity of $\theta_M$ in the plurality of $\theta_M$ is equal to the quantity of distributed joint angles in the plurality of distributed joint angles, and where each $\theta_M$ is a sigma point of the probability function $(\mu, \sigma^2)$.

19. The control system of claim 18 where the each error is equal to a $z_i$ and where $A_i x - b = z_i$, where $A_i$ is the specific transformation matrix when the specific joint angle corresponding to the each error is utilized as the at least one joint angle, and where x is the prospective control parameter x, and where b is the end effector parameter b, such that the error function is minimized subject to $A_i x - b = z_i$ for every error in the plurality of errors.

20. The control system of claim 19 where the error function is a residual sum of squares of every error in the plurality of errors.

* * * * *